US009836180B2

(12) United States Patent
Huang et al.

(10) Patent No.: US 9,836,180 B2
(45) Date of Patent: Dec. 5, 2017

(54) SYSTEMS AND METHODS FOR PERFORMING CONTENT AWARE VIDEO EDITING

(71) Applicant: Cyberlink Corp., Shindian, Taipei (TW)

(72) Inventors: Jau-Hsiung Huang, New Taipei (TW); Yuong-Wei Lei, Taipei (TW); Min-Kuang Wang, Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 439 days.

(21) Appl. No.: 13/890,418

(22) Filed: May 9, 2013

(65) Prior Publication Data

US 2014/0026053 A1 Jan. 23, 2014

Related U.S. Application Data

(60) Provisional application No. 61/673,549, filed on Jul. 19, 2012.

(51) Int. Cl.
| | |
|---|---|
| *G06F 3/048* | (2013.01) |
| *G06F 3/0481* | (2013.01) |
| *G11B 27/031* | (2006.01) |
| *G11B 27/28* | (2006.01) |
| *G11B 27/34* | (2006.01) |

(52) U.S. Cl.
CPC .......... *G06F 3/0481* (2013.01); *G11B 27/031* (2013.01); *G11B 27/28* (2013.01); *G11B 27/34* (2013.01)

(58) Field of Classification Search
CPC ...................................... G06F 3/048

USPC ......................................................... 715/723
See application file for complete search history.

(56) References Cited

U.S. PATENT DOCUMENTS

| 7,734,144 B2 | 6/2010 | Navenka et al. |
| 7,773,112 B2 | 8/2010 | Whitling et al. |
| 7,978,925 B1 * | 7/2011 | Souchard ...................... 382/254 |

(Continued)

OTHER PUBLICATIONS

Wei-Qi Yan and Mohan S. Kankanhalli, "Detection and Removal of Lighting & Shaking Artifacts in Home Videos", Oct. 26, 2002.

(Continued)

*Primary Examiner* — Xuyang Xia
(74) *Attorney, Agent, or Firm* — McClure, Qualey & Rodack, LLP

(57) ABSTRACT

A method implemented in a video editing device comprises retrieving media content and generating a user interface comprising a graphical representation of the retrieved media content on a first timeline component. The method further comprises analyzing the retrieved media content to extract attributes associated with the media content and generating a second timeline component in the user interface. At least a portion of the extracted attributes is arranged along the second timeline component with respect to time, and each of the portion of extracted attributes is represented by a corresponding graphical representation. Furthermore, each attribute corresponds to a segment in the media content. The method further comprises retrieving, based on the displayed attributes arranged along the graphical timeline component, a selection of at least one segment of the media content.

20 Claims, 10 Drawing Sheets

(56) References Cited

U.S. PATENT DOCUMENTS

| | | | |
|---|---|---|---|
| 2010/0281380 A1* | 11/2010 | Langmacher | G06F 3/04847 715/723 |
| 2010/0305732 A1* | 12/2010 | Serletic | 700/94 |
| 2010/0325547 A1* | 12/2010 | Keng | G11B 27/034 715/723 |
| 2012/0051658 A1* | 3/2012 | Tong et al. | 382/224 |
| 2012/0148216 A1 | 6/2012 | Pavagada et al. | |
| 2012/0198338 A1* | 8/2012 | Flint | G11B 27/034 715/726 |

OTHER PUBLICATIONS

"Youtube Now Auto-Fixes Shaky and Dark Videos with New Editing Tool," http://9to5google.com/2012/03/21/youtube-now-auto-fixes-shaky-and-dark-videos-with-new-editing-tool/, Mar. 21, 2012.
"Adobe Premiere Pro CS6 What's New", 2012.

\* cited by examiner

SYSTEMS AND METHODS FOR PERFORMING CONTENT AWARE VIDEO EDITING

CROSS-REFERENCE TO RELATED APPLICATION

This application claims priority to, and the benefit of, U.S. Provisional Patent Application entitled, "Systems and Methods for Performing Content Aware Video Editing," having Ser. No. 61/673,549, filed on Jul. 19, 2012, which is incorporated by reference in its entirety.

BACKGROUND

Over the years, digital video content has gained increasing popularity with consumers. With the ever-growing amount of audio and video content available to consumers through the Internet using computers, smart phones, and other sources, consumers have access to a vast amount of content and programming. Furthermore, many devices (e.g., PCs, DVD recorders) and services that are readily available allow consumers to record, time-shift or view on-demand video and audio content.

The availability of multimedia content in a vast array of digital formats has facilitated distribution of multimedia content because of the high degree of portability. A user may capture video of an event such as a graduation event, a wedding, or a performance. Such user-generated content can be lengthy and many times, contain such defects as poor lighting and shaking caused by movement of the camera while capturing the video. Off-the-shelf video editing applications provide users with the capability to incorporate special effects into captured images, audio and video. Some video editing/playback applications allow users to incorporate comments and tags at specific points within the video. However, video editing can be a complex and time-consuming task, particularly for users with less experience.

SUMMARY

Briefly described, one embodiment, among others, is a method implemented in a video editing device that comprises retrieving media content and generating a user interface comprising a graphical representation of the retrieved media content on a first timeline component. The method further comprises analyzing the retrieved media content to extract attributes associated with the media content and generating a second timeline component in the user interface. At least a portion of the extracted attributes is arranged along the second timeline component with respect to time, and each of the portion of extracted attributes is represented by a corresponding graphical representation. Furthermore, each attribute corresponds to a segment in the media content. The method further comprises retrieving, based on the displayed attributes arranged along the graphical timeline component, a selection of at least one segment of the media content.

Another embodiment is a video editing system that comprises a media interface configured to obtain media content and a content analyzer configured to analyze the media content and extract attributes associated with the media content, the attributes corresponding to defective segments in the media content. The system further comprises a user interface (UI) generator configured to generate a user interface comprising a graphical representation of the retrieved media content on a first timeline component. The UI generator is further configured to generate a second timeline component in the user interface, and at least a portion of the extracted attributes is arranged along the second timeline component with respect to time. Each of the portion of extracted attributes is represented by a corresponding graphical representation. The UI generator is further configured to retrieve, based on the displayed attributes arranged along the graphical timeline component, a selection corresponding to at least one segment of the media content.

Another embodiment is a non-transitory computer-readable medium embodying a program executable in a computing device. The program comprises code that generates a graphical representation of media content on a first timeline component and code that extracts attributes associated with the media content, the attributes corresponding to possible defects in the media content, and wherein each attribute corresponds to a segment in the media content. The program further comprise code that generates a user interface including a second timeline component, wherein at least a portion of the extracted attributes is arranged along the second timeline component with respect to time, wherein each of the portion of extracted attributes have a corresponding graphical component. The program further comprises code that retrieves, based on the displayed attributes arranged along the graphical timeline component, a selection comprising at least a portion of at least one segment of the media content.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

One perceived shortcoming with traditional multimedia editing solutions is the degree of time and complexity involved in the editing of multimedia content such as video and audio clips. With many multimedia editing applications, users must first preview the entire video and manually identify points of interest before performing such editing operations as copying video segments of interest and creating new video segments by combining or re-ordering copied segments. Furthermore, depending on the quality of the video, the user may have to first identify segments within the video clip with such defects as poor lighting, poor contrast levels, the presence of artifacts, etc. before manually touching up the identified segment(s) to address the defects. As one will appreciate, this can be a time-consuming process, particularly with lengthy video clips.

Various embodiments are disclosed for providing users with an organized framework for editing video content based on analysis performed by a video editing system. In accordance with various embodiments, the video editing system receives multimedia content and analyzes the content to identify possible segments of interest. The video editing system also identifies possible defects within the content. The results of the analysis are then presented to the user in the form of a timeline-based user interface where attributes/characteristics of the content are displayed with respect to time. Such characteristics may include, for example and without limitation, zooming/panning motion by the camera, the identification of one or more faces, fast motion by objects within the content, and so on. Defects may include, for example and without limitation, segments with poor lighting, poor contrast levels, video shaking, and so on.

The presentation of a timeline-based user interface facilitates the selection of one or more segments by the user for editing purposes. For some embodiments, if the user selects a segment of interest that has an identified defect, the video editing system provides the user with an opportunity to rectify the defect. A modified version of the segment of interest is produced by the video editing system, thereby allowing the user to continue with the editing process on the selected segment. A description of a system for facilitating the video editing process is now described followed by a discussion of the operation of the components within the system.

Figure 1:
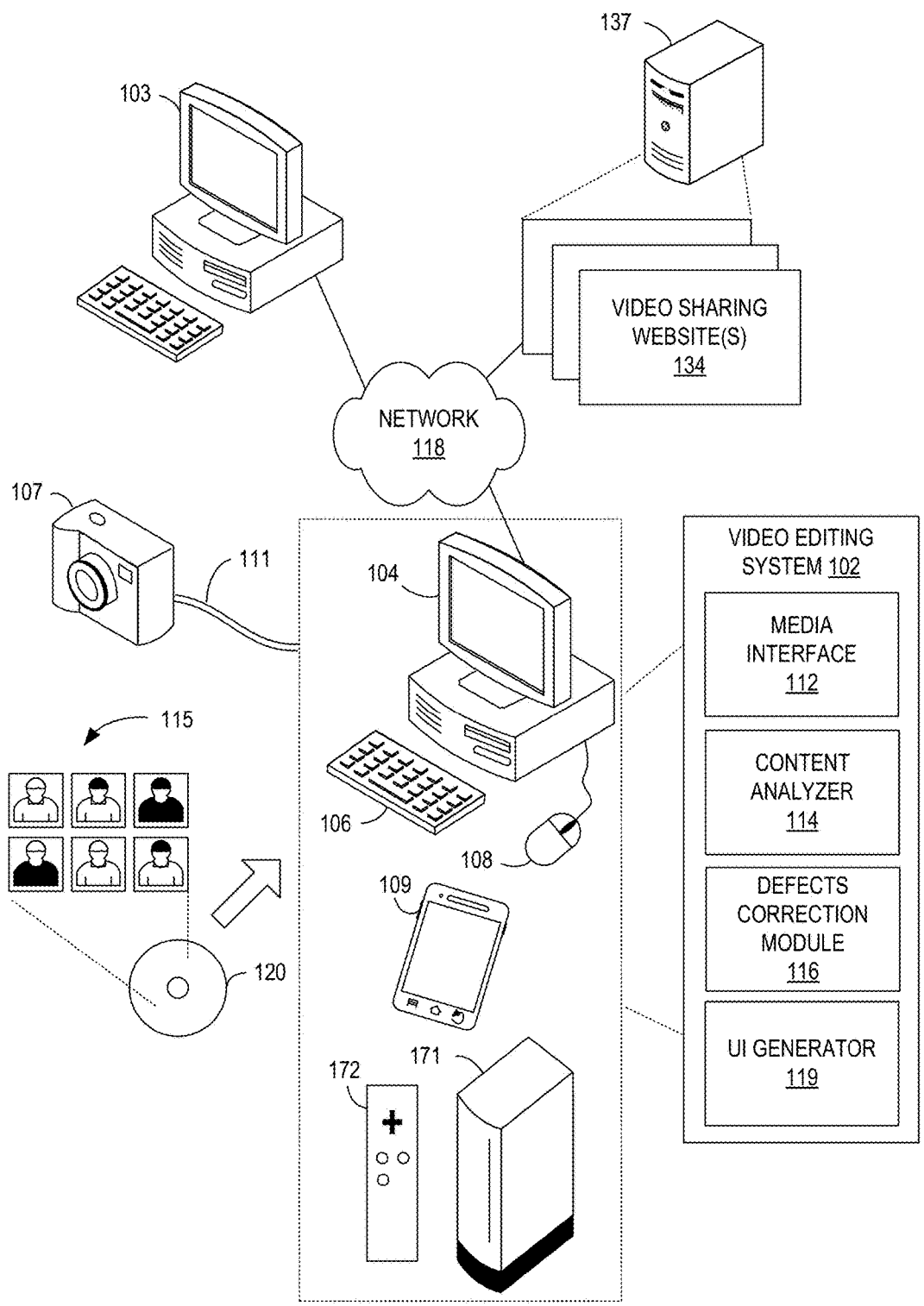
FIG. 1 is a block diagram of a system in which embodiments of a video processing device for facilitating video editing via content analysis may be implemented in accordance with various embodiments of the present disclosure.

FIG. 1 is a block diagram of a video editing system 102 in which embodiments of the video processing techniques disclosed herein may be implemented. The video editing system 102 may be embodied, for example, as a desktop computer, computer workstation, laptop, a smartphone 109, a tablet, or other computing platform and includes a display 104 and may include such input devices as a keyboard 106 and a mouse 108.

For embodiments where the video editing system 102 is embodied as a smartphone 109 or tablet, the user may interface with the video editing system 102 via a touch-screen interface (not shown). In other embodiments, the video editing system 102 may be embodied as a video gaming console 171, which includes a video game controller 172 for receiving user preferences. For such embodiments, the video gaming console 171 may be connected to a television (not shown) or other display.

The video editing system 102 is configured to retrieve, via the media interface 112, digital media content 115 stored on a storage medium 120 such as, by way of example and without limitation, a compact disc (CD) or a universal serial bus (USB) flash drive, wherein the digital media content 115 may then be stored locally on a hard drive of the video editing system 102. As one of ordinary skill will appreciate, the digital media content 115 may be encoded in any of a number of formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

As depicted in FIG. 1, the media interface 112 in the video editing system 102 may also be configured to retrieve digital media content 115 directly from a digital camera 107 where a cable 111 or some other interface may be used for coupling the digital camera 107 to the video editing system 102. The video editing system 102 may support any one of a number of common computer interfaces, such as, but not limited to IEEE-1394 High Performance Serial Bus (Firewire), USB, a serial connection, and a parallel connection.

The digital camera 107 may also be coupled to the video editing system 102 over a wireless connection or other communication path. The video editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the video editing system 102 may receive digital media content 115 from another computing system 103. Alternatively, the video editing system 102 may access one or more video sharing websites 134 hosted on a server 137 via the network 118 to retrieve digital media content 115.

The content analyzer 114 in the video editing system 102 is configured to analyze and identify attributes of the media content 115 retrieved by the media interface 112 in order to facilitate the selection of one or more segments within the media content 115 for editing purposes. Based on the attributes/characteristics identified by the content analyzer 114, the user interface (UI) generator 119 generates a user interface that includes a graphical timeline component with the identified attributes arranged according to time.

The content analyzer 114 is further configured to identify possible defects within the media content 115, where the identified defects are also presented to the user on the graphical timeline component. The interface presented to the user by the UI generator 119 allows the user to select defective segment(s) to modify (e.g., to increase the lighting or increase the contrast level). Based on the user input relating to the defective segment(s), the defects correction module 116 modifies or corrects the identified defect(s). The interface also allows the user to select one or more segments of interest based on the presented attributes on the timeline component for editing purposes.

Figure 2:
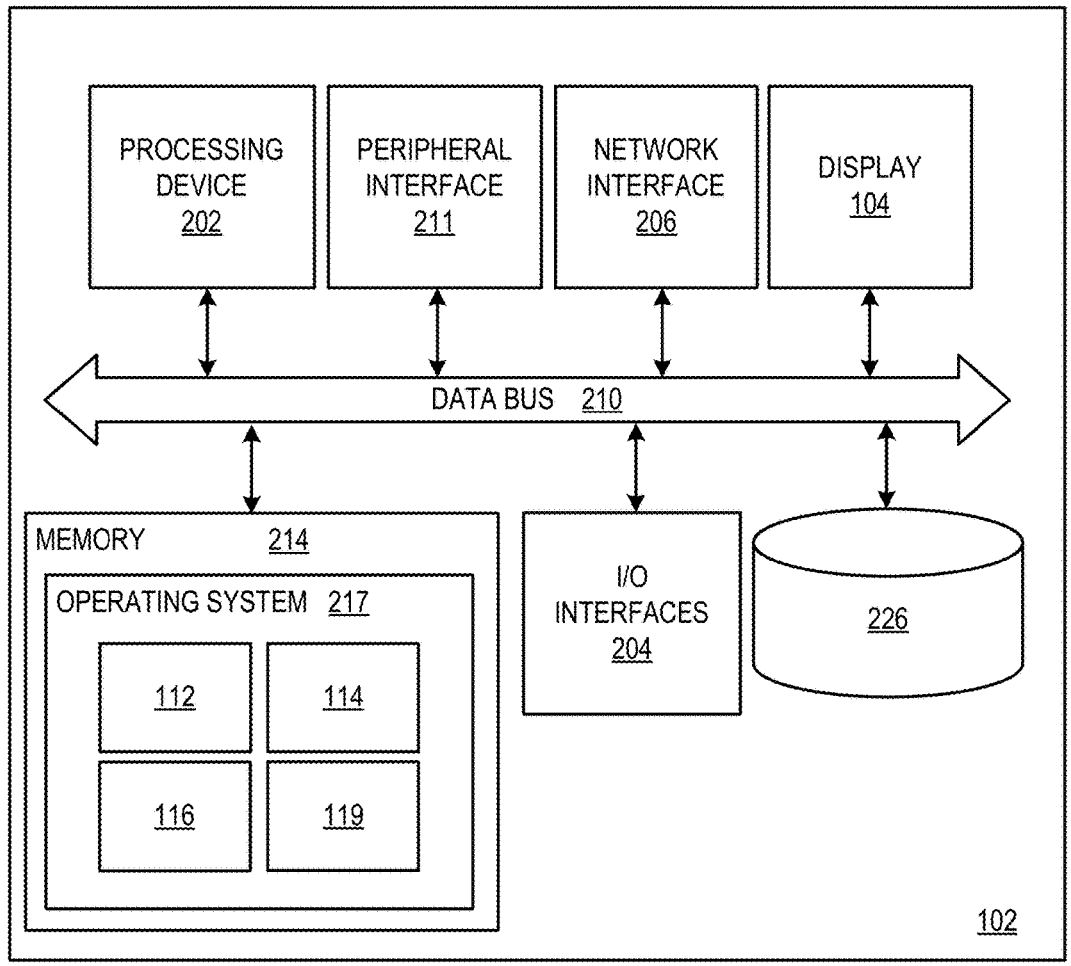
FIG. 2 is a detailed view of the video processing device of FIG. 1 in accordance with various embodiments of the present disclosure.

FIG. 2 is a schematic diagram of the video editing system 102 shown in FIG. 1. The video editing system 102 may be embodied in any one of a wide variety of wired and/or wireless computing devices, such as a desktop computer, portable computer, dedicated server computer, multiprocessor computing device, smartphone, tablet computing device, and so forth. As shown in FIG. 2, the video editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the video editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, content analyzer 114, defects correction module 116, UI generator 119) of the video editing system 102 depicted in FIG. 2. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the video editing system 102 comprises a personal computer, these components may interface with one or more user input devices via the I/O interfaces 204, where the user input devices may comprise a keyboard 106 (FIG. 1) or a mouse 108 (FIG. 1). The display 104 may comprise a computer monitor, a plasma screen for a PC, a liquid crystal display (LCD), a touchscreen display, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The video editing system 102 may communicate with one or more computing devices via the network interface 206 over the network 118 (FIG. 1). The video editing system 102 may further comprise mass storage 226. The peripheral interface 211 supports various interfaces including, but not limited to IEEE-1294 High Performance Serial Bus (Firewire), USB, a serial connection, and a parallel connection.

Figure 3:
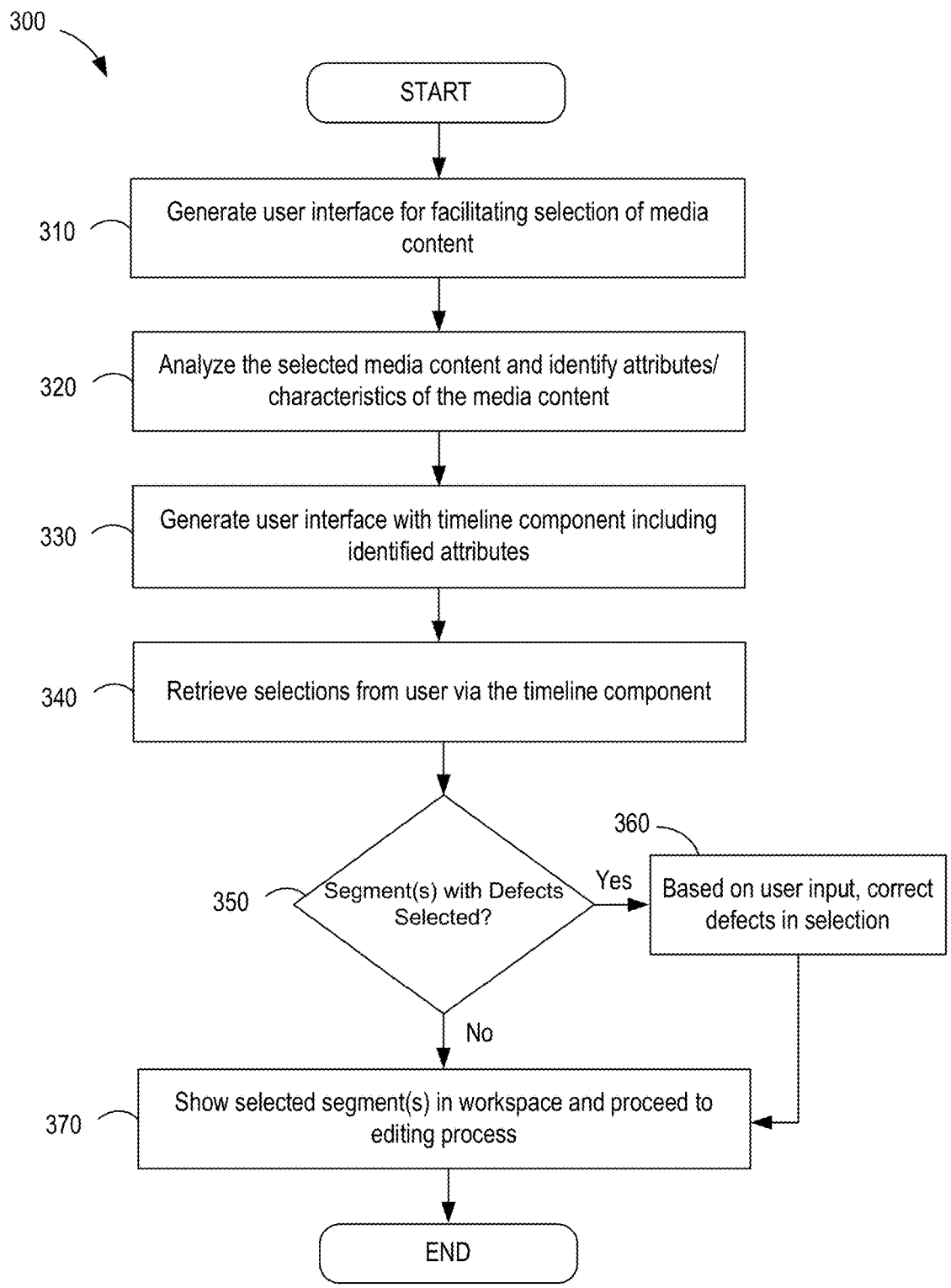
FIG. 3 is a top-level flowchart illustrating examples of functionality implemented as portions of the video processing device of FIG. 1 for facilitating video editing via content aware selection according to various embodiments of the present disclosure.

Reference is made to FIG. 3, which is a flowchart 300 in accordance with one embodiment for facilitating video editing via content analysis. It is understood that the flowchart 300 of FIG. 3 provides merely an example of the many different types of functional arrangements that may be employed to implement the operation of the various components of the video editing system 102 (FIG. 1). As an alternative, the flowchart of FIG. 3 may be viewed as depicting an example of steps of a method implemented in the video editing system 102 according to one or more embodiments.

Beginning with block 310, the UI generator 119 (FIG. 1) generates a user interface displayed to the user for selecting target media content for editing purposes. In accordance with some embodiments, the interface may include a first timeline component 411 (FIG. 4) to facilitate the selection of a segment for editing purposes. In block 320, upon selection by the user of the target media content, the content analyzer 114 (FIG. 1) begins the content aware editing process by analyzing the selected media content 115 (FIG. 1) and identifying various attributes of the selected media content 115.

In block 330, the UI generator 119 generates another user interface that includes a (second) graphical timeline component 431 (FIG. 5), where the various attributes/characteristics (e.g., shaky video, poor lighting, the presence of zooming motion by the camera, the presence of one or more faces, fast/slow motion) identified by the content analyzer 114 are presented relative to time along the timeline component 431 of purposes of facilitating the selection of one or more segments within the target media content for editing purposes.

In block 340, the UI generator 119 retrieves one or more selections from the user based on presentation of the timeline 431 component to the user. At decision block 350, a determination is made on whether any of the selected segment(s) by the user contain defects identified by the content analyzer 114. In block 360, if a defective segment was selected, the user is prompted on whether to correct the identified defect.

Based on the user's response, the defects correction module 116 (FIG. 1) rectifies the defect(s) and generates a modified version of the selected segment. The method then proceeds to block 370 where the selected segments are shown in a workspace area of the user interface and in the first timeline, and the editing process is then performed on the selected segments. Returning back to decision block 350, if none of the selected segments contains an identified defect, then the method proceeds to block 370.

Figure 4:
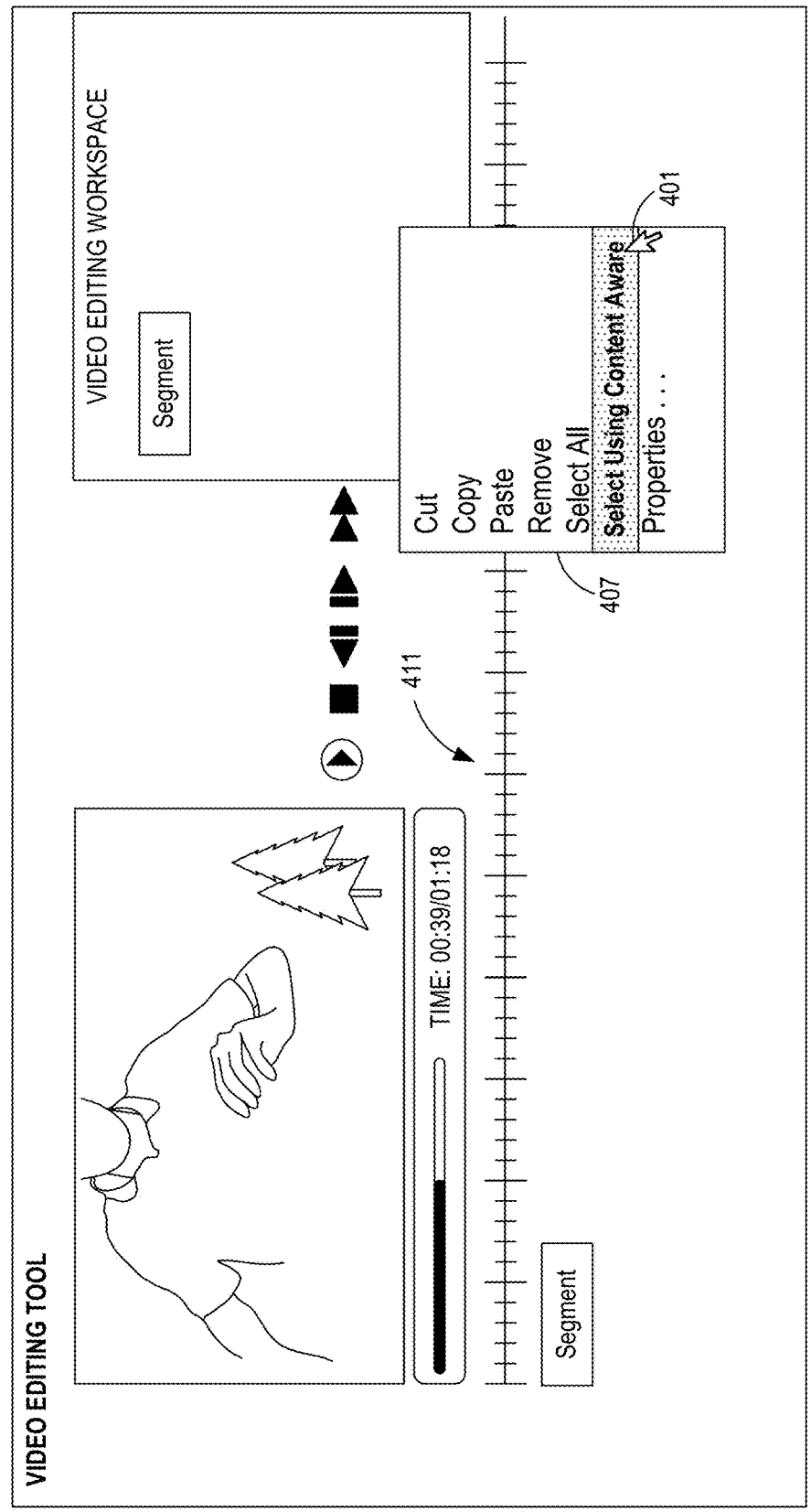
FIG. 4 is an example user interface for editing a video clip in accordance with various embodiments.

Reference is made to FIG. 4, which is an example user interface for editing a video clip in accordance with various embodiments. The example interface shown allows the user to perform such editing functions as copying and pasting of segments in order to create an edited video clip. Shown in FIG. 4 is a master timeline 411 that corresponds to the edited video clip. In the example shown, the user has selected "segment 1," which then undergoes analysis to identify attributes and/or defects corresponding to the segment. To select additional segments using the content aware techniques disclosed, the user may invoke a selection menu 407 using a pointer 401 such as a mouse pointer. As described, the content aware techniques facilitate the selection of segments within a video by presenting different attributes/characteristics associated with the target media content in a timeline-based user interface, which the user utilizes for selecting segments.

Figure 5A:
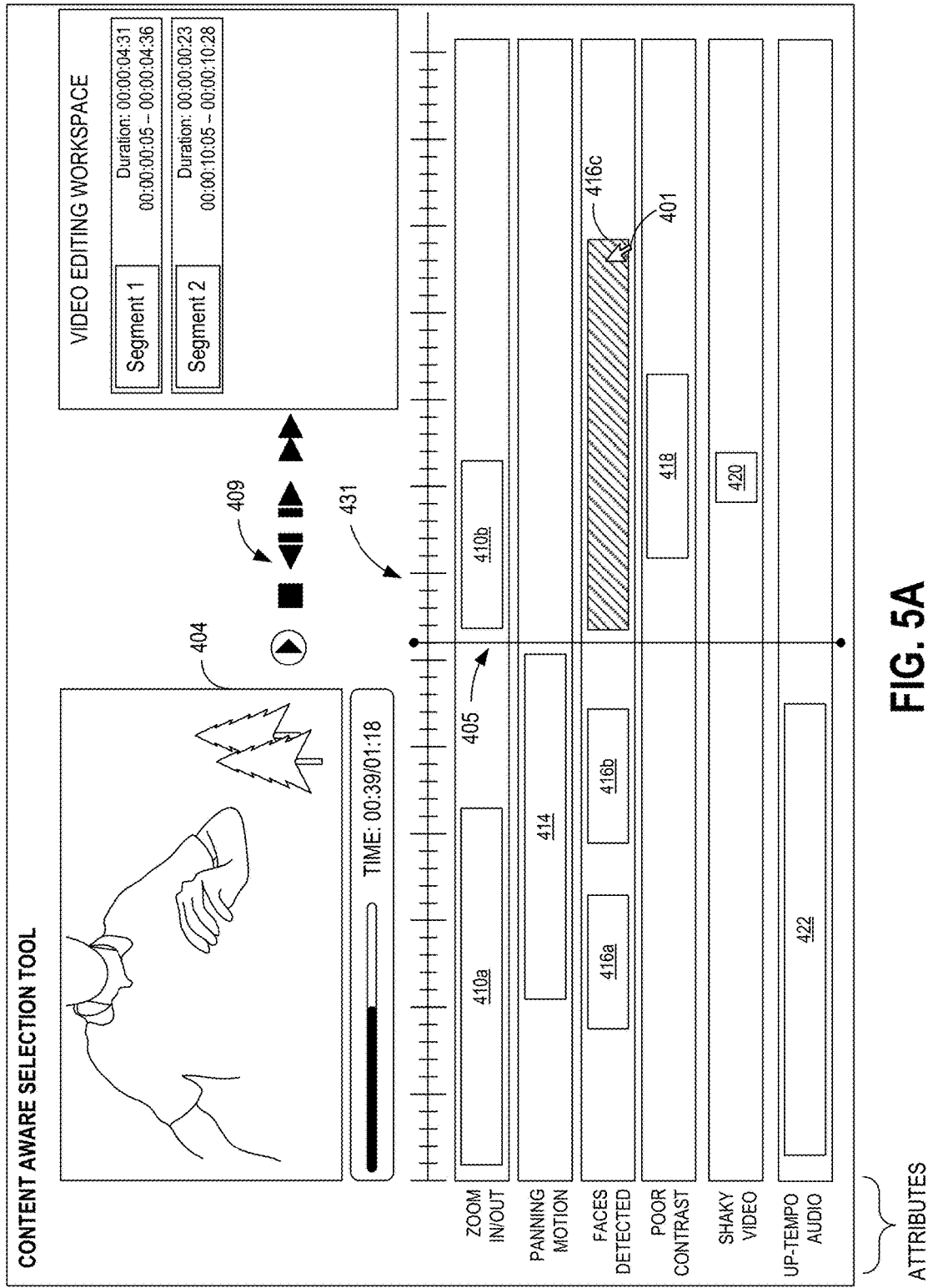
FIGS. 5A, 5B, and 5C illustrate various features relating to an example user interface for facilitating the selection of segments of interest within a video based on the content aware techniques described in accordance with various embodiments.

Reference is made to FIG. 5A, which is an example user interface for facilitating the selection of segments of interest within a video based on the content aware techniques described. After selecting media content of interest (e.g., a video clip), the content analyzer 114 (FIG. 1) analyzes the entire video clip and identifies various attributes/characteristics associated with the video clip. For some embodiments, content analyzer 114 stores time stamp information associated with the presence of various attributes/characteristics at different points within the video. For example, the content analyzer 114 may determine that the camera zooms in and out for a duration of time spanning Time 1 to Time 2.

To facilitate the selection of segments within the video, a timeline component 431 is provided in the user interface where the various attributes identified by the content analyzer 114 are arranged according to a time axis, where each attribute is represented by a distinct graphical component that corresponds to a segment. In the example of FIG. 5A, for example, each graphical component comprises a bar. Furthermore, the width of each bar corresponds to the duration of the attribute/characteristic represented by the bar. For example, the timeline 431 conveys to the user that the camera performs a zooming motion where the occurrence of the zooming motion is represented by the bars 410a, 410b shown. As another example, the occurrence of a panning motion is represented by the bar 414 shown.

As another example, the timeline 431 shows three different bars 416a, 416b, 416c, which correspond to three different instances in which one or more faces are shown in the video. The progression component 405 corresponds to the current point in time during playback of the content. Also shown are defects identified by the content analyzer 114. As shown in FIG. 5A, the content analyzer 114 identifies a portion of the video in which the video exhibits poor contrast levels as represented by bar 418. The timeline 431 further includes a bar 420 associated with a portion of the video in which the video exhibits shaky motion. Note that the attributes associated with the media content is not limited to attributes corresponding to the video portion and may include attributes corresponding to the audio portion as well. In the example shown, the timeline 431 further includes a bar 422 associated with a portion of the media content in which up-tempo audio is present. Other attributes corresponding to the audio portion of the media content may further include, for example, speech characteristics, noise levels, pitch, tonality, and energy level.

To select a segment of interest, the user may use a pointer 401 such as a mouse pointer on the interface to hover over the graphical representation corresponding to the target segment and click on the graphical representation of the segment to be selected. For purposes of this disclosure, a segment may comprise a video clip or a portion of a video clip. For implementations where the video editing system 102 is embodied as a smart phone 109 (FIG. 1) or tablet, the user may select segments of interest via a touchscreen display. For some embodiments, the user interface may also include a segmentation (not shown) for specifying locations relative to segments.

Figure 5B:
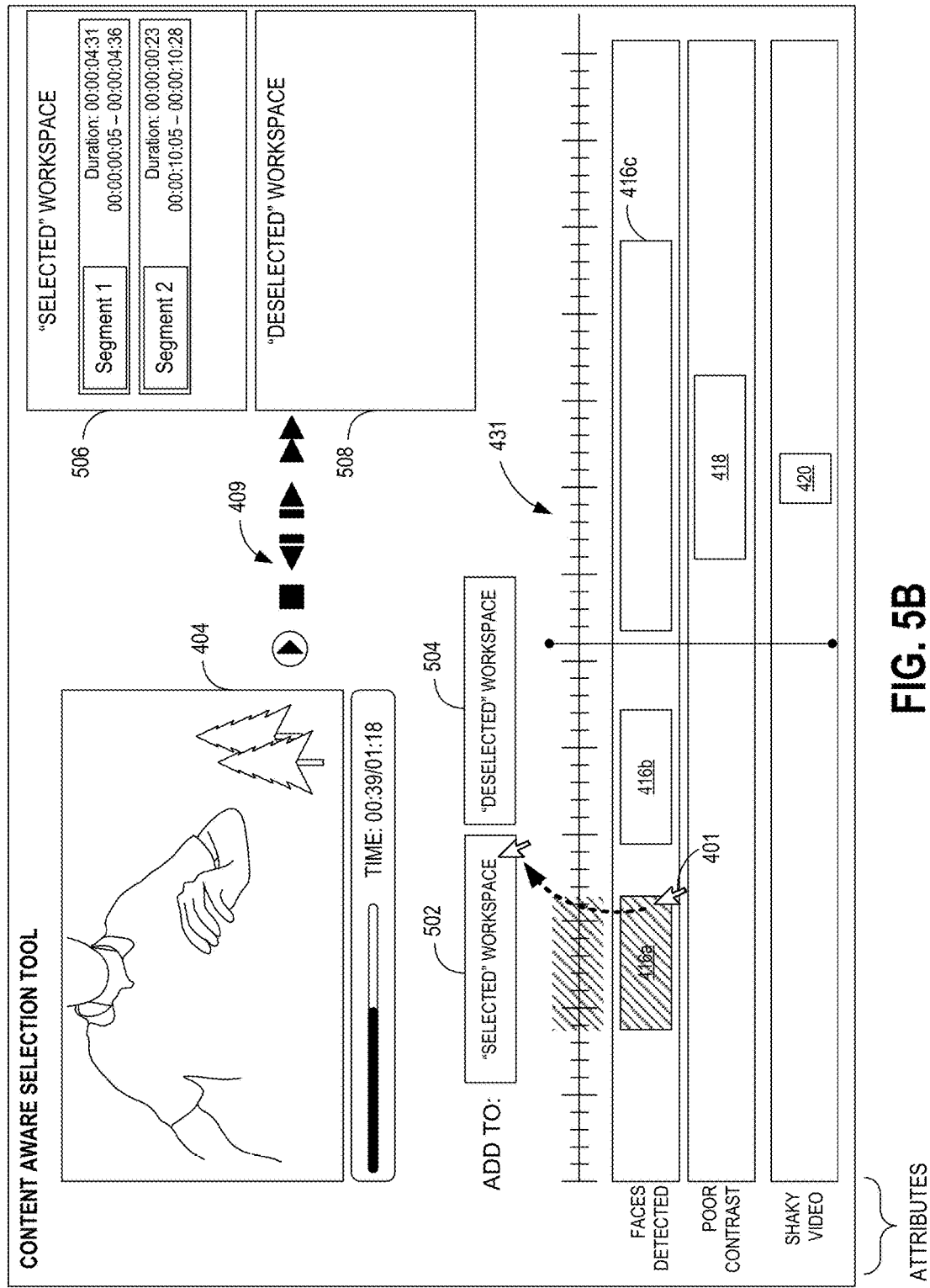

Reference is made to FIG. 5B, which illustrates a variation of the user interface of FIG. 5A, where the user interface further comprises selection tools 502, 504 for selecting and/or deselecting segments. In the example shown, the user utilizes the pointer 401 to first select a segment of interest (i.e., the segment represented by bar 416a). The user then clicks on one of the components 502, 504 to either add the selected segment to the "selected" workspace 506 or to the "deselected" workspace 508. In the event that the user adds a segment to the "selected" workspace, the corresponding block of time is highlighted in the timeline component 431, as shown. The "selected" workspace 506 and the "deselected" workspace are part of the video editing workspace.

Figure 5C:
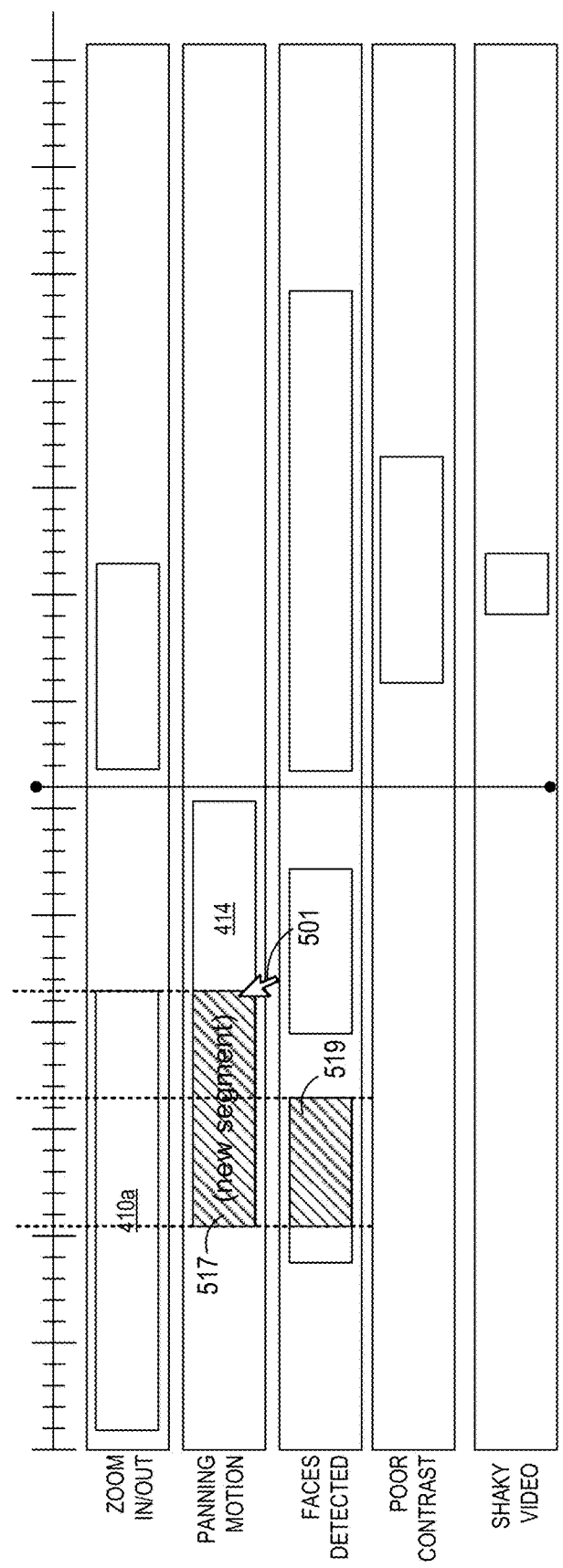

FIG. 5C illustrates yet another aspect of the selection process, where the user may manually select or define a subset 517 (i.e., "new segment") of the segment of interest represented by bar 414 based on an overlapping portion relative to another segment represented by bar 410a. The user may define the subset 517 using a pointer 501 or other segmentation tool. Significantly, this allows the user to define a segment that exhibits multiple attributes—in this case, the presence of both zooming and panning motions by the camera. In the example shown, the user could have alternatively defined another segment subset 519 that exhibits three attributes—the presence of both zooming and panning motions by the camera as well as the presence of faces.

Figure 6:
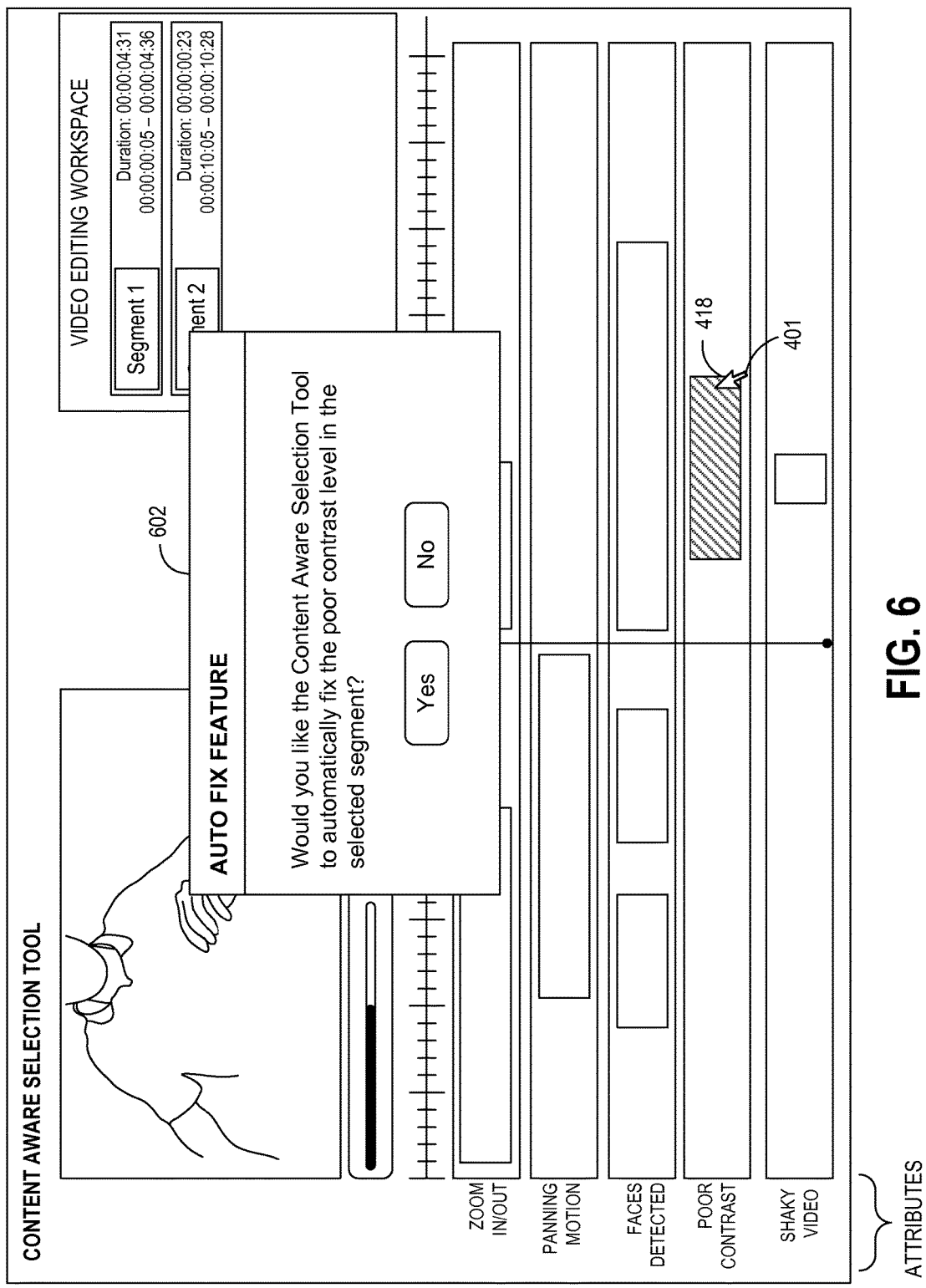
FIG. 6 illustrates the example user interface of FIG. 5 where the user is prompted in response to selection of a defective segment.

FIG. 6 illustrates the example user interface of FIG. 5 where the user is prompted in response to selection of a defective segment. As shown, the user selects a segment represented by bar 418, which the content analyzer 114 (FIG. 1) determines as having poor contrast. In accordance with various embodiments, in response to selection by the user of a segment with an identified defect, the user is given the opportunity to remedy the defect.

Figure 7:
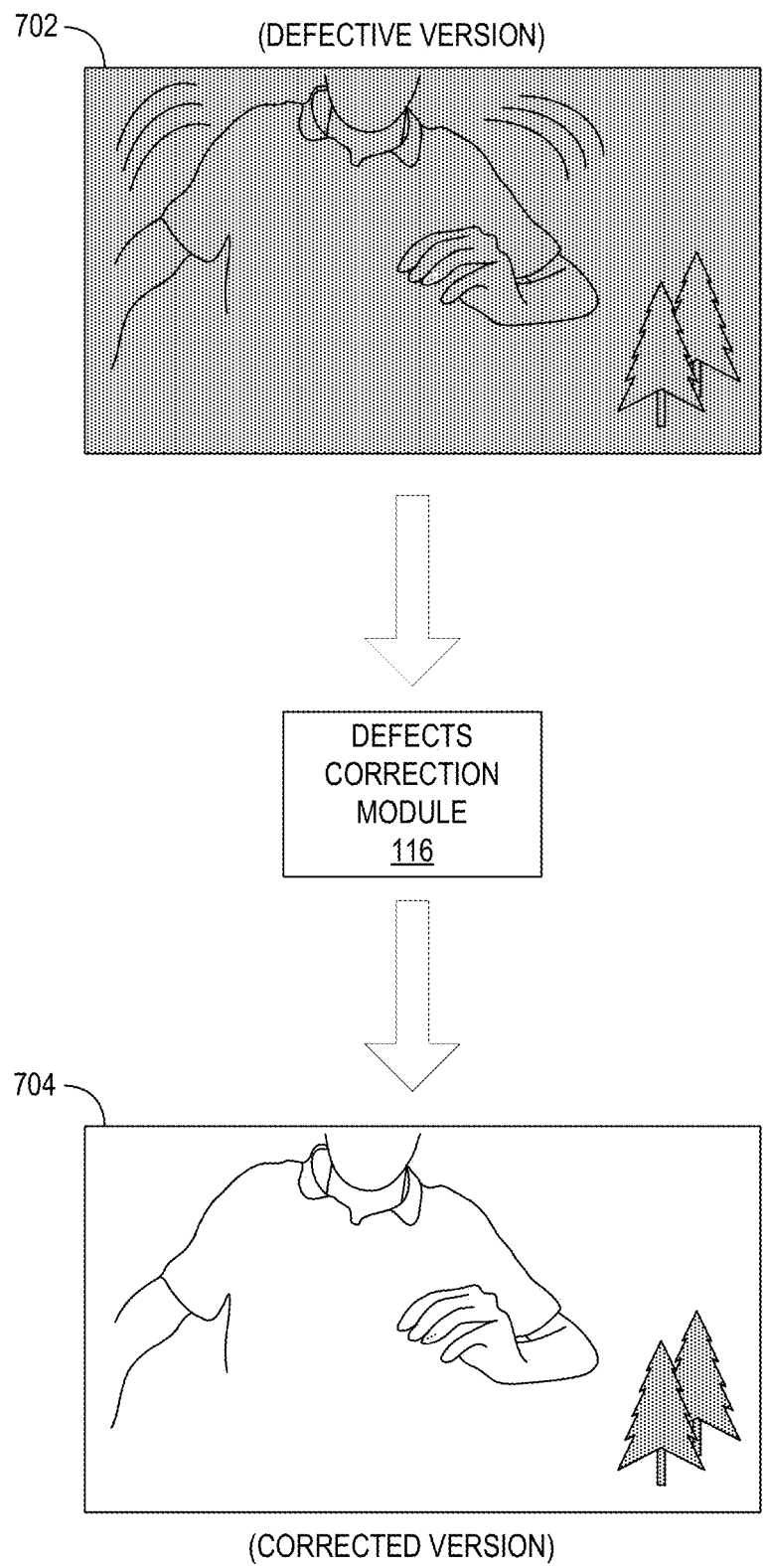
FIG. 7 illustrates the correction of a defective segment by the defects module of FIG. 1.

In the example user interface, a dialog box 602 is presented to the user asking whether the user would like the defects correction module 116 (FIG. 1) to automatically remedy the defect—in this case, adjust the contrast levels. The user can either elect to automatically fix the defect or simply ignore the defect. As shown in FIG. 7, based on the user's response, the defects correction module 116 (FIG. 1) processes the defective segment 702 (which exhibits both poor contrast and shaky video) and generates a corrected version 704, which is then selected for editing purposes. For example, with reference back to FIG. 5A, the defects correction module 116 may be configured to automatically fix defects associated with the segment represented by bar 418 and the segment represented by 420 based on the user's input. The user has full control over which defective segments undergo further processing by the defects correction module 116.

Figure 8:
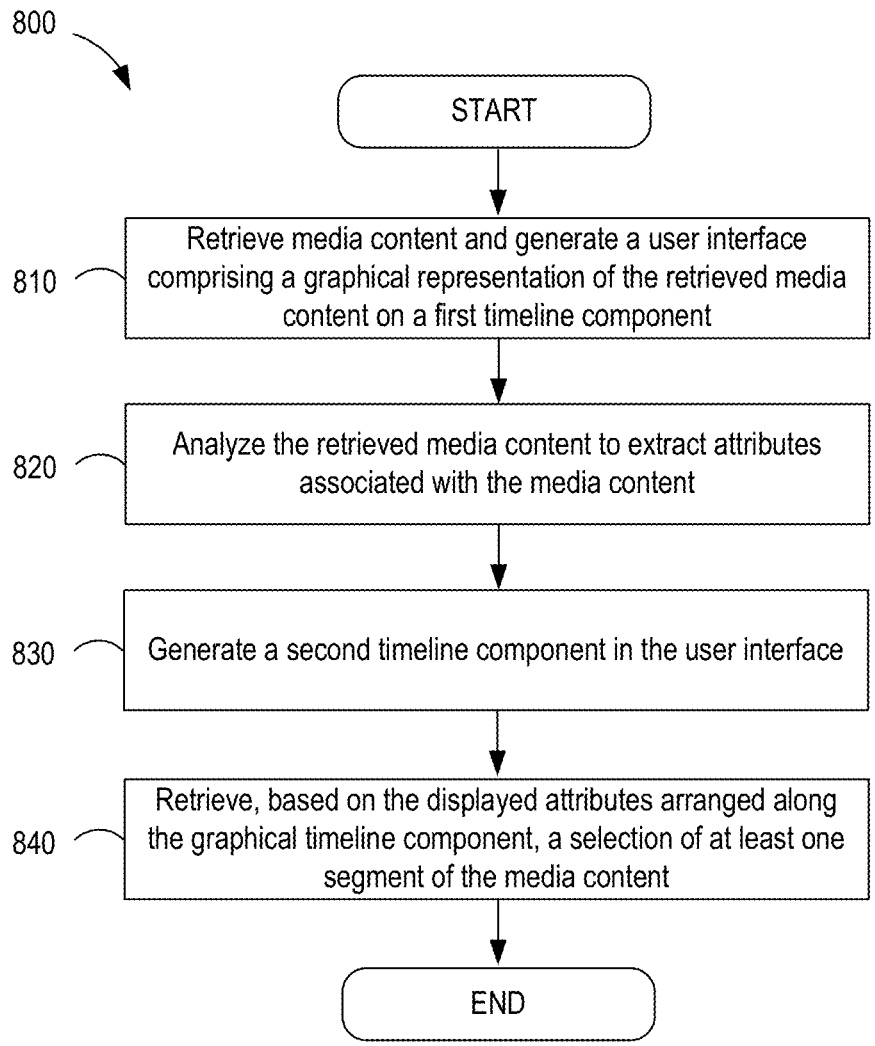
FIG. 8 is a top-level flowchart illustrating examples of functionality implemented as portions of the video processing device of FIG. 1 for facilitating video editing via content aware selection according to various embodiments of the present disclosure.

Reference is made to FIG. 8, which is a flowchart 800 in accordance with an embodiment for editing video performed by the video editing system 102 of FIG. 1. It is understood that the flowchart 800 of FIG. 8 provides merely an example of the many different types of functional arrangements that may be employed to implement the operation of the various components of the video editing system 102 (FIG. 1). As an alternative, the flowchart of FIG. 8 may be viewed as depicting an example of steps of a method implemented in the video editing system 102 according to one or more embodiments.

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. It is understood that all such variations are within the scope of the present disclosure.

Beginning with block 810, the media interface 112 (FIG. 1) in the video editing system 102 retrieves media content, and the UI generator 119 (FIG. 1) generates a user interface comprising a graphical representation of the retrieved media content on a first timeline component.

In block 820, the content analyzer 114 (FIG. 1) analyzes the retrieved media content to extract attributes associated with the media content. In block 830, the UI generator 119 generates a second timeline component in the user interface. At least a portion of the extracted attributes is arranged along the second timeline component with respect to time, and each of the portion of extracted attributes is represented by a corresponding graphical representation. Furthermore, each attribute corresponds to a segment in the media content. In block 840, the UI generator 119 retrieves, based on the displayed attributes arranged along the graphical timeline component, a selection of at least one segment of the media content.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method of editing video in a video editing device, comprising:
retrieving, by the video editing device, media content and generating a user interface comprising a graphical representation of the retrieved media content on a first timeline component;
analyzing the retrieved media content to extract attributes associated with the media content, the media content comprising a video clip;
generating a second timeline component in the user interface, wherein at least a portion of the extracted attributes exhibited by the video clip is arranged along the second timeline component with respect to time and with respect to attribute type to identify any extracted attributes exhibited by the video clip that overlap with respect to time, wherein each of the portion of extracted attributes exhibited by the video clip is represented by a corresponding graphical representation, and wherein each attribute is represented by a distinct graphical component that corresponds to a segment in the video clip along the second timeline component;
retrieving, based on the displayed attributes arranged along the second timeline component, a selection of at least one segment of the video clip;
determining whether the selection of the at least one segment corresponds to a target category of attributes, wherein the target category of attributes correspond to defects in the media content and comprises one of: zooming/panning motion, video shaking, and fast/slow motion; and
responsive to the selection of the at least one segment exhibiting defects corresponding to the target category of attributes, performing the steps of:
retrieving a user input specifying whether to modify the selected at least one segment exhibiting defects; and
based on the user input, generating a modified version of the selected at least one segment whereby one or more defects in the selected at least one segment are removed or reduced.

2. The method of claim 1, further comprising generating the first timeline display for facilitating one of: selection of segments, trimming of segments, and reordering of segments.

3. The method of claim 1, wherein the at least a portion of the extracted attributes comprises: camera motion, facial detection, and object motion within the media content.

4. The method of claim 3, wherein the camera motion comprises at least one of: zooming motion and panning motion.

5. The method of claim 1, wherein the at least a portion of the extracted attributes correspond to an audio portion of the media content.

6. The method of claim 5, wherein the at least a portion of the extracted attributes comprise noise characteristics, tempo, pitch, tonality, and audio energy level.

7. The method of claim 1, wherein a location of each graphical representation corresponds to a starting time of the corresponding attribute, and wherein a width of each graphical representation corresponds to a duration of the corresponding attribute in the media content.

8. The method of claim 1, wherein the user interface further comprises a selection tool in the user interface for specifying locations relative to the graphical representations.

9. A video editing system, comprising:
a memory storing instructions; and
a processor coupled to the memory and configured by the instructions to:
obtain media content;
analyze the media content and extract attributes associated with the media content, the attributes corresponding to defective segments in the media content, the media content comprising a video clip; and
generate a user interface by a UI generator comprising a graphical representation of the retrieved media content on a first timeline component; wherein the UI generator is further configured to generate a second timeline component in the user interface, wherein at least a portion of the extracted attributes exhibited by the video clip is arranged along the second timeline component with respect to time and with respect to attribute type to identify any extracted attributes exhibited by the video clip that overlap with respect to time, wherein each of the portion of extracted attributes exhibited by the video clip is represented by a corresponding graphical representation along the second timeline component:
retrieve, based on the displayed attributes arranged along the second timeline component, a selection corresponding to at least one segment of the video clip;
determine whether the selection of the at least one segment corresponds to a target category of attributes, wherein the target category of attributes correspond to defects in the media content and comprises one of: zooming/panning motion, video shaking, and fast/slow motion; and responsive to the selection of the at least one segment exhibiting defects corresponding to the target category of attributes, perform:

retrieve a user input specifying whether to modify the selected at least one segment exhibiting defects; and based on the user input, generate a modified version of the selected at least one segment whereby one or more defects in the selected at least one segment are removed or reduced.

10. The system of claim 9, wherein the processor is further configured to:

retrieve a user input specifying whether to modify a defective segment prior to generating the modified version of the selected at least one segment and in response to the selection corresponding to the target category of attributes.

11. The system of claim 10, wherein the processor is further configured to rectify the defective segment based on the user input.

12. The system of claim 9, wherein the at least a portion of the extracted attributes comprises: camera motion, facial detection, and object motion within the media content.

13. The system of claim 9, wherein the camera motion comprises at least one of: zooming motion and panning motion.

14. The system of claim 9, wherein the graphical representations comprise bars arranged in the user interface.

15. The system of claim 14, wherein a location of each bar corresponds to a starting time of the corresponding attribute, and wherein a width of each bar corresponds to a duration of the corresponding attribute in the media content.

16. The system of claim 9, wherein the user interface further comprises a segmentation tool in the user interface for specifying locations relative to segments.

17. The system of claim 9, wherein the selection corresponding to the at least one segment of the media content comprises a user-defined portion of the at least one segment.

18. A non-transitory computer-readable medium embodying a program executable in a computing device, comprising:

retrieve, by the computing device, media content;

generate a user interface including a graphical representation of the retrieved media content on a first timeline component, the media content comprising a video clip;

analyze the retrieved media content to extract attributes associated with the media content, the attributes corresponding to possible defects in the media content, and wherein each attribute is represented by a distinct graphical component that corresponds to a segment in the media content;

generate a second timeline component in the user interface, wherein at least a portion of the extracted attributes exhibited by the video clip is arranged along the second timeline component with respect to time and with respect to attribute type to identify any extracted attributes exhibited by the video clip that overlap with respect to time, when-)in each of the portion of extracted attributes exhibited by the video clip has a corresponding graphical component along the second timeline component;

retrieve, based on the displayed attributes arranged along the second timeline component, a selection comprising at least a portion of at least one segment of the video clip;

determine whether the selection of the at least one segment corresponds to a target category of attributes, wherein the target category of attributes correspond to defects in the media content and comprises one of: zooming/panning motion, video shaking, and fast/slow motion; and retrieve a user input specifying whether to modify the selected at least one segment exhibiting defects; and based on the user input generate a modified version of the selected at least one segment responsive to the selection of the at least one segment exhibiting defects corresponding to the target category of attributes, wherein one or more defects in the selected at least one segment are removed or reduced.

19. The non-transitory computer-readable medium of claim 18, further comprising code that retrieves a user input specifying whether to modify the defective segment prior to generating the modified version of the selected at least one segment and in response to the selection corresponding to the target category of attributes.

20. The non-transitory computer-readable medium of claim 19, further comprising code that rectifies the defective segment based on the user input.

* * * * *